(12) United States Patent
Golan

(10) Patent No.: US 7,036,367 B2
(45) Date of Patent: May 2, 2006

(54) FLOW VELOCITY MEASUREMENT METHOD AND APPARATUS, INCLUDING APPLICATIONS THEREOF FOR MEASURING HEAT FLOW, AND WIND VELOCITY AND/OR DIRECTION GENERATION

(75) Inventor: Gady Golan, Hod Hasharon (IL)

(73) Assignee: A.T.C.T. Advanced Thermal Chips Technologies Ltd., Tel Aviv (IL)

( * ) Notice: Subject to any disclaimer, the term of this patent is extended or adjusted under 35 U.S.C. 154(b) by 284 days.

(21) Appl. No.: 10/844,397

(22) Filed: May 13, 2004

(65) Prior Publication Data

US 2004/0231412 A1  Nov. 25, 2004

Related U.S. Application Data

(60) Provisional application No. 60/471,711, filed on May 20, 2003.

(51) Int. Cl.
  *G01F 1/68* (2006.01)

(52) U.S. Cl. .................................... 73/204.11

(58) Field of Classification Search ............... 73/204.11, 73/204.23, 204.25, 204.16
See application file for complete search history.

(56) References Cited

U.S. PATENT DOCUMENTS

| | | | | |
|---|---|---|---|---|
| 5,069,066 A | * | 12/1991 | Djorup | 73/204.15 |
| 5,112,136 A | * | 5/1992 | Sakuma et al. | 374/44 |
| 5,335,513 A | * | 8/1994 | Campbell et al. | 73/753 |
| 6,509,553 B1 | * | 1/2003 | Golan et al. | 73/204.11 |

* cited by examiner

*Primary Examiner*—Edward Lefkowitz
*Assistant Examiner*—Takisha Miller
(74) *Attorney, Agent, or Firm*—G.E. Ehrlich (1995) Ltd.

(57) ABSTRACT

A method and apparatus for measuring the flow velocity of a flowing fluid includes a positive temperature coefficient thermistor to be immersing within the flowing fluid in order to provide a measurement of the rate of heat dissipation of the thermistor produced by the flowing fluid, and thereby a measurement the flow velocity of the fluid. The positive temperature coefficient thermistor used has a resistance which increases sharply at the predetermined temperature at which electrical current is maintained in the thermistor such that the thermistor is self-controlled to maintain substantially the predetermined temperature, whereby the electrical current drawn by the thermistor is a measurement of the thermal load on the thermistor resulting from the thermal heat dissipation therefrom by the flowing fluid, and thereby a measurement of the flow velocity of the fluid. Various embodiments of the invention are described, including those for measuring heat flow in a centralized heating or air conditioning system, wind velocity and direction, and flow velocity in a wind tunnel.

28 Claims, 4 Drawing Sheets

FLOW VELOCITY MEASUREMENT METHOD AND APPARATUS, INCLUDING APPLICATIONS THEREOF FOR MEASURING HEAT FLOW, AND WIND VELOCITY AND/OR DIRECTION GENERATION

RELATED APPLICATION

The present application is related to Provisional Application No. 60/471,711, filed May 20, 2003, and claims the priority date of that application.

FIELD AND BACKGROUND OF THE INVENTION

The present invention relates to a method and apparatus for measuring flow velocity of a fluid. The invention is particularly useful in various types of systems including: a system for measuring heat flow; an anemometer for measuring wind velocity and direction; and a wind tunnel for measuring wind velocity. The invention is therefore described below with respect to the above applications, but it will be appreciated that the invention can advantageously be used in other applications as well.

There are many situations wherein it is necessary or desirable, e.g., for cost allocation purposes or for billing purposes, to measure heat flow, i.e., heat taken from or added to a system. Examples of the above include hot-water heating systems, air conditioning systems, heat exchangers, waste-heat recovery units, de-super heaters, and solar heating systems. In many cases such as in heating and air conditioning systems, the electrical energy consumed in generating the heat added to the working fluid, or in extracting the heat from the working fluid, cannot be conveniently distinguished for cost-allocation or billing purposes from the electrical energy consumed for other uses, e.g., for lighting, operating machines, etc. There is therefore a need for a simple, efficient and inexpensive system for measuring heat flow directly.

Another field in which the present invention is particularly useful is in anemometers for measuring the velocity and direction of the wind. The anemometers commonly used today for this purpose generally include mechanically moving parts which are prone to errors, particularly during long periods of operation, because of soiling by dust transported with the air and failure of electric components by aging. Similar drawbacks are involved in measuring the velocity of the wind in wind tunnels. Therefore, there is also a need for a simple, efficient and inexpensive system for measuring wind velocity and/or wind direction in an anemometer or wind tunnel.

OBJECTS AND BRIEF SUMMARY OF THE PRESENT INVENTION

An object of the present invention is to provide a method and apparatus having advantages in one or more of the above respects for measuring fluid-flow velocity, particularly useful in measuring heat flow in a heating or cooling system, wind velocity and direction in an anemometer, and/or flow velocity in a wind tunnel.

According to one aspect of the present invention, there is provided a method of measuring the flow velocity of a flowing fluid, comprising: immersing within the flowing fluid a thermistor having a resistance varying with temperature; applying electrical current through the thermistor to heat it to, and to maintain it at, a predetermined temperature above that of the flowing fluid; producing a measurement of the electrical current through the thermistor while maintained at the predetermined temperature, thereby providing a measurement of the rate of heat dissipation of the thermistor produced by the flowing fluid in which the thermistor is immersed; and utilizing the measurement of electrical current to produce a measurement of the flow velocity of the flowing fluid; characterized in that the electrical resistor is a positive temperature coefficient thermistor driven by a constant voltage source and having a resistance which increases sharply at said predetermined temperature, such that the thermistor is automatically self-controlled to substantially maintain the predetermined temperature, whereby the electrical current drawn by the thermistor is a measurement of the thermal load on the thermistor resulting from the thermal heat dissipation therefrom by the flowing fluid, and thereby a measurement of the flow velocity of the fluid.

In this respect, reference is made to U.S. Pat. No. 6,509,553 (in which one of the joint inventors is the inventor in the present application) disclosing the use of positive temperature coefficient thermistors for providing an indication of the composition of a fluid in which the thermistor is immersed. Reference is also made to U.S. patent application Ser. No. 10/344,134, filed Aug. 16, 2001 by the inventor of the present application disclosing the use of positive temperature coefficient thermistors for efficiently evaporation liquids, such as for the removal of water condensation in an air conditioning system. The present invention involves additional applications of such thermistors particularly to provide simple, efficient and inexpensive systems for measuring heat flow, wind velocity and direction, and/or wind tunnel flow velocity.

Thus, in one application of the invention described below, the flowing fluid in which the thermistor is immersed is a working fluid in a heat flow system in which the working fluid has an initial temperature at the inlet to the system and a final temperature at the outlet from the system. As described the initial temperature and the final temperature of the working fluid are also measured and utilized with the flow velocity measurement to produce a measurement of the rate of heat flow in the system.

In the described preferred embodiments, the heat flow system is a centralized heating or cooling system for supplying heated or cooled air to a plurality of utilization units. The flow velocity, initial temperature, and final temperature of the working fluid supplied to each of the utilization units are measured and utilized to produce a measurement of the rate of heat flow in each of the utilization units. In one described embodiment, each of the utilization units is an apartment unit to be heated or cooled; and in another described embodiment, each of the utilization units is a workpiece processing unit utilizing heat or cold during a workpiece treating process.

Another application of the present invention is described below wherein the velocity of the flowing fluid is measured along each of two non-parallel axes to produce a measurement of both the flow velocity and the flow direction of the flowing fluid. In this described application, the flowing fluid is the wind, and the flow velocity of the wind is measured in a duct system including at least two ducts aligned along axes at an angle to each other. More particularly, the described duct system includes a first pair of ducts along a first axis, and a second pair of ducts along a second axis orthogonal to the first axis.

In one described preferred embodiment, the ducts of each of pair are located side-by-side along parallel axes. Each of the ducts is tapered from a large-diameter at one end to a small-diameter at the opposite end. The ducts of each pair are oppositely disposed such that each end of each pair of ducts includes the large-diameter end of one duct of the pair, and the small-diameter end of the other duct of the pair.

In another described preferred embodiment, the ducts of the first pair are coaxially aligned with each other along the first axis, and the ducts of the second pair are coaxially aligned with each other along the second axis orthogonal to the first axis.

The invention also provides various types of apparatus operating in accordance with the foregoing method.

As will be described more particularly below, such method and apparatus can be implemented in relatively simple, inexpensive and efficient systems for making various measurements involving fluid flow velocity, including: heat flow in heating and air-conditioning systems: wind velocity and direction in anemometers, and wind velocity in wind tunnels. A particular advantage of the invention, especially when implemented in the foregoing applications, is that the apparatus requires no moving parts, substantially no maintenance, and has a virtually infinite lifetime.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF PREFERRED EMBODIMENTS

The Embodiment of FIGS. 1–4

Figure 1:
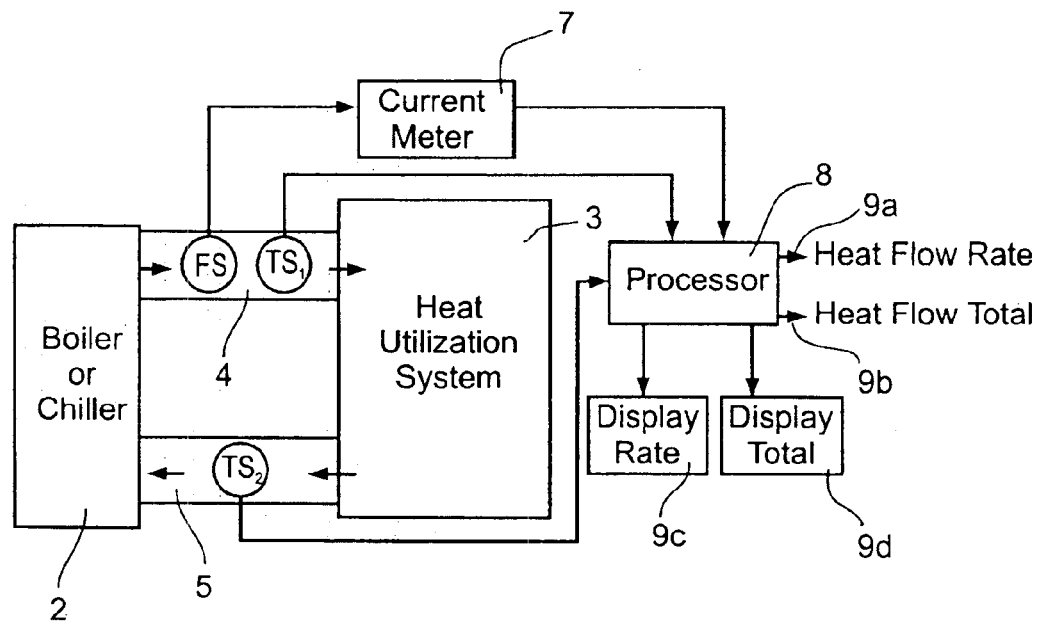
FIG. 1 is a block diagram illustrating one form of system for measuring heat flow in accordance with the present invention.

FIG. 1 is a block diagram illustrating a system for monitoring heat flow, i.e., the quantity of heat added to or taken from a fluid, in accordance with the present invention. Such heat flow monitoring systems, commonly called BTU measuring systems, are useful in measuring heat flow in heating systems, air conditioning systems, heat-exchanger systems, and the like, for cost allocation or billing purposes.

The system illustrated in FIG. 1 includes a boiler or chiller 2 supplying heat or cold to a heat utilization system 3 via a working fluid. The working fluid flows through a supply duct 4 from the boiler or chiller 2 to the heat utilization system 3, and through a return duct 5 back to the boiler or chiller.

The supply duct 4 includes a flow sensor FS which senses the flow rate of the working fluid therethrough, and a temperature sensor $TS_1$ for sensing the initial temperature of the working fluid flowing therethrough to the utilization system 3. The return duct 5 also includes a temperature sensor $TS_2$ for sensing the final temperature of the working fluid as it is returned from the utilization system 3 to the boiler or chiller.

As known, determination of the flow rate of the working fluid through the utilization system 3, and the difference between the two temperatures of the working fluid in the return duct 5 and supply duct 4, respectively, enables the heat flow rate to be measured. Thus, in a boiler-type heating system, the initial temperature $TS_1$ in the supply duct 4 will be high, and the final temperature $TS_2$ in the return duct 5 will be low, so that the utilization system 3 receives heat from the working fluid; whereas in a chiller or air conditioning system, the temperature $TS_1$ in the supply duct 4 will be low, and the final temperature $TS_2$ in the return duct will be higher, such that the utilization system adds heat to the working fluid. In either case, the rate of heat flow is measured in a simple, inexpensive and efficient manner by the positive temperature coefficient thermistor FS, and the two temperature sensors $TS_1$ and $TS_2$, as described more particularly below.

The two temperature sensors $TS_1$ and $TS_2$ are preferably negative temperature coefficient (NTC) thermistors. Such thermistors have a resistance decreasing substantially linearly with temperature, thereby producing an electrical output signal increasing substantially linearly with temperature. Flow sensor FS, however, is a positive temperature coefficient (PTC) thermistor. Such a thermistor has a resistance which, at a particular temperature, increases sharply with respect to temperature so as to automatically operate substantially at a predetermined maximum temperature. Thus, when the thermistor is operating at the predetermined maximum temperature, it produces a current flow through the thermistor directly related to the thermal load on the thermistor.

As further shown in FIG. 1, PTC thermistor FS, serving as the flow sensor, is powered by a power supply 6 which applies electrical current through the thermistor to heat it to a predetermined temperature above that of the working fluid in the supply duct 4 as measured by temperature sensor $TS_1$.

The predetermined temperature (above that of the working fluid) is the temperature at which the resistance of the PTC thermistor FS increases sharply.

Figure 2:
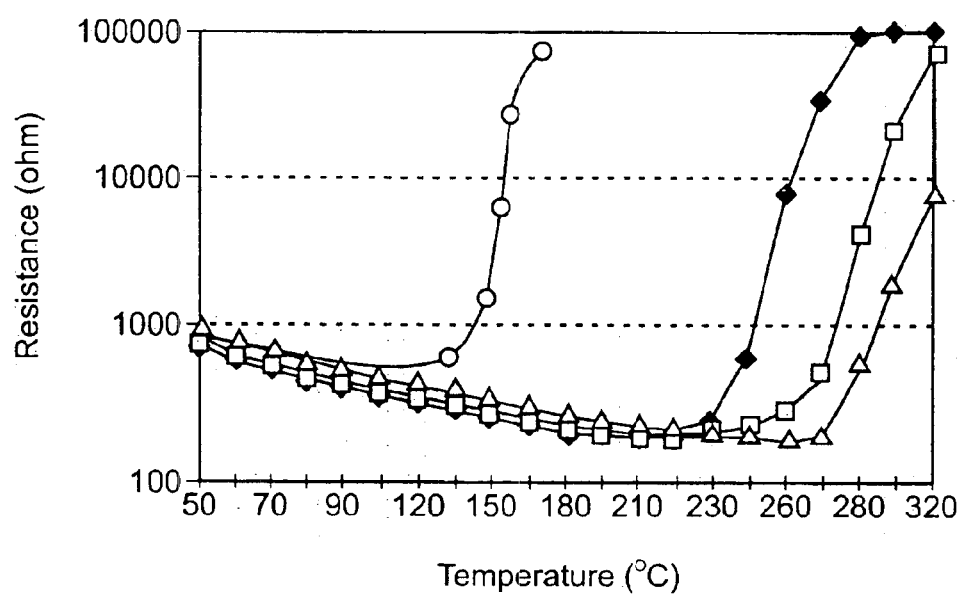
FIG. 2 includes a set of curves illustrating the temperature-resistance relationship of four typical positive temperature coefficient (PTC) thermistors, as used in accordance with the present invention.

FIG. 2 includes curves illustrating the temperature-resistance relationship of three typical PTC thermistors, wherein it will be seen that at a predetermined temperature, depending on the composition of the thermistor, the resistance increases sharply virtually to infinity. Accordingly, such a thermistor supplied by acoustical voltage source automatically self-regulates itself, without any feedback controls, so as to maintain the desired predetermined temperature above the temperature of the working fluid in the supply duct 4. Since the temperature remains constant, the current through the thermistor therefore varies in accordance with the thermal load on the thermistor. This thermal load in turn varies with the rate that heat of the thermistor is dissipated by the flowing working fluid, and thereby, with the flow velocity of the working fluid.

As one example, the PTC thermistor of the leftmost curve in FIG. 2 could be used, in which case the predetermined temperature to which the thermistor would be healed would be about 130° C.

The electrical current through thermistor FS is measured by current meter 7 which outputs an electrical signal serving as one input to a processor 8. Processor 8 includes a second input from temperature sensor $TS_1$ corresponding to the temperature of the working fluid flowing through the supply duct 4. Processor 8 includes a third input from temperature sensor $TS_2$ corresponding to the temperature of the working fluid through the return duct 5. The foregoing inputs are processed by processor 8 which produces an output at 9a representing the heat flow rate, and another output at 9b representing the total heat flow over a predetermined time interval. The two outputs may be recorded and used for billing purposes, cost-allocating purposes, and the like, and may also be displayed in displays 9c and 9d, respectively.

As described above, by using a PTC thermistor for the flow sensor FS the circuit is self-controlled to maintain the predetermined temperature of the working fluid in the supply duct 4 without the need for feed-back. Moreover, the system requires no moving parts, substantially no maintenance, and has a virtually infinite lifetime. A preferred PTC thermistor that may be used for flow sensor FS is one made of barium titanate since this material is characterized by a very high resistance to corrosion and a relatively low hazard to explosion.

Figure 3:
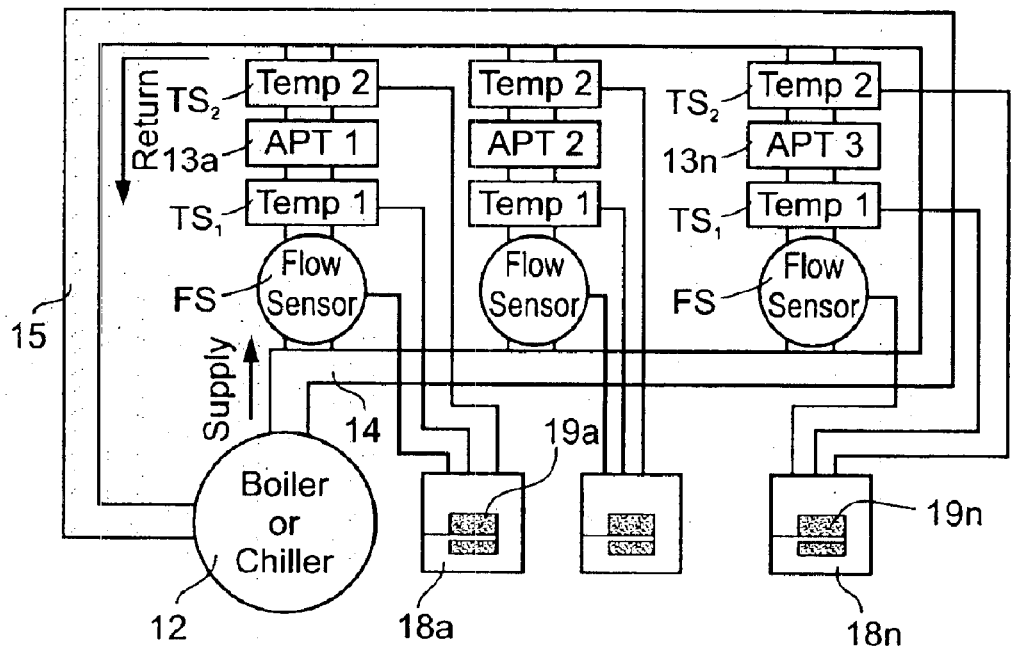
FIG. 3 is a block diagram illustrating a heat-flow measuring system constructed in accordance with the present invention implemented in a centralized heating and/or air-conditioning system for measuring heat flow with respect to a plurality of apartments.

FIG. 3 is a block diagram illustrating the above-described heat-flow system implemented in a centralized heating or cooling system for supplying heated or cooled air to a plurality of utilization devices, in this case apartment units. The centralized system illustrated in FIG. 3 includes a boiler or chiller 12 for supplying heated or cooled air to a plurality of apartment units, indicated at 13a–13n, via a working fluid circulated to the apartment units by a supply duct 14, and returned to the boiler or chiller via a return duct 15.

As shown in FIG. 3, the apartment units 13a–13n are in parallel branches between the supply duct 14 and the return duct 15. Each branch includes a flow sensor FS for sensing the rate of flow of the working fluid through the respective branch, a temperature sensor $TS_1$ for sensing the initial temperature of the working fluid at the inlet to the respective apartment unit, and a temperature sensor $TS_2$ for sensing the final temperature of the working fluid at the outlet of the apartment unit before returned to the boiler or chiller via the return duct 15. As described above with respect to FIG. 1, the flow sensor FS in the respective branch is a positive temperature coefficient (PTC) thermistor for measuring the flow velocity of the working fluid through the respective branch; whereas the two temperature sensors $TS_1$, $TS_2$ are negative temperature coefficient (NTC) thermistors for measuring the initial temperature and final temperature, respectively, of the working fluid in the respective branch.

As further shown in FIG. 3, each of the branches is provided with a processor 18a–18n, connected to receive the outputs of the flow sensor FS and the temperature sensors $TS_1$, $TS_2$, in the respective branch, and to compute therefrom a measurement of the rate of heat flow in the respective branch, as well as the total heat flow therein for the respective time period. It will be appreciated that the foregoing processing operations can be performed by a centralized processor for all the apartment units. The measurements produced in either case may be continuously displayed by displays 19a–19n provided for each apartment unit.

Figure 4:
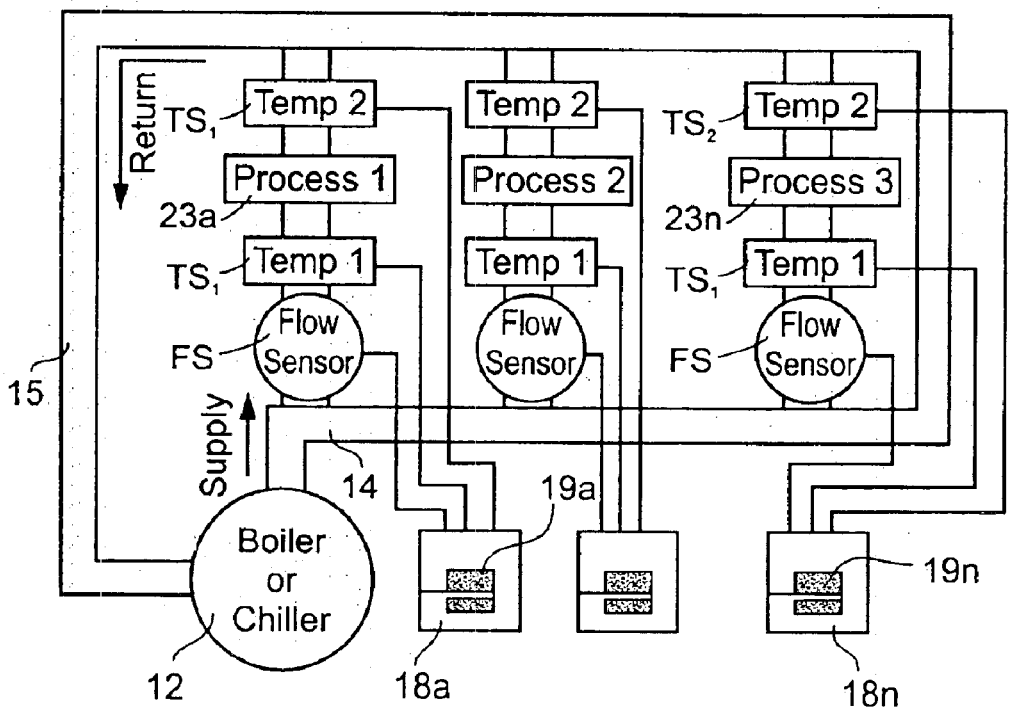
FIG. 4 is a block diagram illustrating a heat-flow measuring system constructed in accordance with the present invention implemented in a centralized workpiece processing system for measuring heat flow with respect to a plurality of workpiece processing units.

FIG. 4 illustrates a centralized heating or cooling system for supplying heated or cooled air to a plurality of utilization units in the form of workpiece processing units, shown at 23a–23n, each of which utilizes heat or cold during a workpiece treating process. The other components of the system illustrated in FIG. 4 are the same as described above with respect to FIG. 3, and therefore the same reference numerals have been used to identify the corresponding components.

Figure 5:
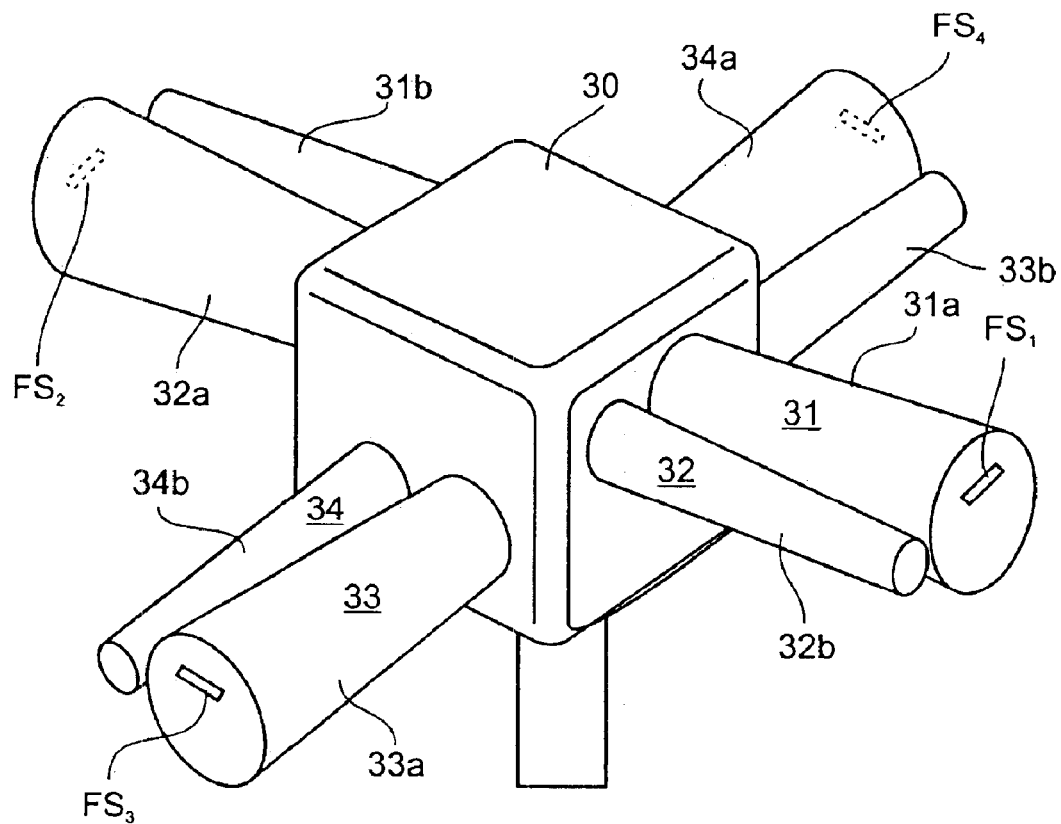
FIG. 5 pictorially illustrates one form of anemometer constructed in accordance with the present invention.
Figure 6:
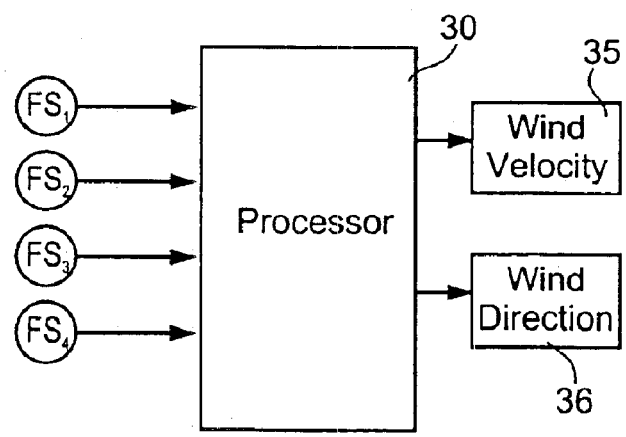
FIG. 6 is a block diagram illustrating the electrical system in the anemometer of FIG. 5 for measuring wind velocity and direction.
Figure 7:
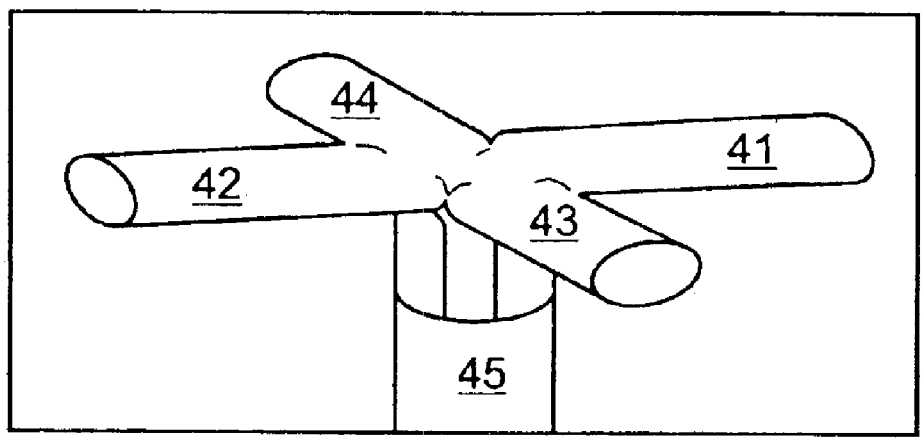
FIG. 7 is pictorially illustrates another anemometer constructed in accordance with the present invention.

The Embodiments of FIGS. 5–7

FIGS. 5–7 illustrate the invention implemented in an anemometer, for measuring the flow velocity and direction of the wind. Thus, by measuring the velocity of the wind along each of two non-parallel axes, preferably orthogonal axes, a determination may be made of both the flow velocity and the direction of the wind.

FIG. 5 pictorially illustrates one construction of an anemometer in accordance with the present invention, and FIG. 6 is a block diagram illustrating the electrical system in the anemometer of FIG. 5.

The anemometer illustrated in FIG. 5 includes a duct system having a first pair of ducts 31, 32 along a first axis X, and a second pair of ducts 33, 34 along a second axis Y orthogonal to the first axis.

In the construction illustrated in FIG. 5, the ducts of each pair are located side-by-side along parallel axes. That is, the axis of duct 31 is at the side of and parallel to the axis of duct 32, both axes being parallel to the X-axis of the duct pair 31, 32; similarly, the axis of duct 33 is at the side of and parallel to the axis of duct 34, both axes of this pair being parallel to the Y-axis.

As further seen in FIG. 5, each of the ducts is tapered from a large-diameter at one end to a small-diameter at the opposite end. In addition, the two ducts of each pair are oppositely disposed such that each end of each pair of ducts includes the large-diameter end of one duct of the pair, and the small-diameter end of the other duct of the pair. Thus, as shown in FIG. 5, the large-diameter end 31a of duct 31 and the small-diameter end 32b of duct 32 are at one end of the duct pair 31, 32; whereas the opposite end of that duct pair includes the small-diameter end 31b of duct 31 and the large-diameter end 32a of duct 32. Similarly, the large-diameter end 33a of duct 33 and the small-diameter end 34b of duct 34 are at one end of duct pair 33, 34; whereas the small-diameter end 33b of duct 33 and the large-diameter end 34a of duct 34 are at the opposite end of the duct pair.

Each of the ducts 31–34 includes a flow sensor $FS_1$–$FS_4$ for sensing the rate of flow of the fluid (wind) through the respective duct. As shown in FIG. 5, the flow sensors $FS_1$–$FS_4$ are preferably in the large-diameter end of the respective duct since this location of the flow sensor minimizes the effect of its presence on the component of the wind intercepted by, and flowing through, the respective duct. Each of the flow sensors $FS_1$–$FS_4$ is a positive temperature coefficient (PTC) thermistor as described above, such that the electrical current through it is a measurement of the thermal load on the respective thermistor, and thereby a measurement of the wind velocity at the respective end of the respective duct.

FIG. 6 is a block diagram illustrating the electrical system in the anemometer construction of FIG. 5, to produce electrical outputs corresponding to both the wind velocity and the wind direction. Thus, as shown in FIG. 6, the electrical system includes a processor 30 which receives a measurement of the current flow through each of the four flow sensors $FS_1$–$FS_4$. Since the specific orientation of the two pairs of ducts 31, 32 and 33, 34, respectively, are known with respect to the two orthogonal axes X, Y, and also with respect to each other, the information inputted by the flow sensors $FS_1$–$FS_4$ is sufficient to enable the processor 30 to compute both the wind velocity and the wind direction. This information is outputted via displays 31, 32.

FIG. 7 illustrates another anemometer construction in accordance with the present invention and also including a first pair of ducts 41, 42, aligned along one axis (e.g., the X-axis) and a second pair of ducts 43, 44 aligned along the other orthogonal axis (e.g., the Y-axis). In this case, however, the two ducts of each pair are coaxially aligned with each other along their respective axes. Thus, ducts 41 and 42 have a common axis which is coaxial with the X-axis; and ducts 43, 44 also have a common axis, which is coaxial with the Y-axis.

As further shown in FIG. 7, each of the ducts has an outer end 41a–44a exposed to the wind, and an inner end 41b–44b angularly displaced with respect to its outer end for mounting the ducts within a mounting member 45. The outer ends 41a–44a of each duct exposed to the wind includes a positive temperature coefficient (PTC) thermistor FS serving as the flow sensor for sensing the velocity of the wind intercepted by the respective duct in the manner described above.

In FIG. 7, the outer ends of the ducts 41–44 are shown as of substantially uniform diameter. It will be appreciated, however, that those ends of the ducts could also be tapered as described above with respect to FIG. 5. The block diagram of FIG. 6 described above with respect to FIG. 5 is also applicable with respect to FIG. 7.

As in the heat-flow monitoring systems illustrated in FIGS. 1–4, the fluid-flow (wind) monitoring systems illustrated in FIGS. 5–7 also require no moving parts and substantially no maintenance, and therefore have virtually infinite lifetime. Moreover, since the PTC sensor is of such small thermal mass, it has small thermal inertia. This makes such systems particularly useful in measuring gusts, i.e., sudden, strong rushes of air or wind, from other directions than the mainstream. For example, the illustrated systems can measure a North-East wind of two nautical miles, and a South-West upper gusts of four nautical miles once every two minutes.

The output of the system (e.g., processor 30, FIG. 6) could include not only wind direction and wind speed, but also wind upper gust direction and speed, and further, statistics and periodicity of these upper gusts.

Figure 8:
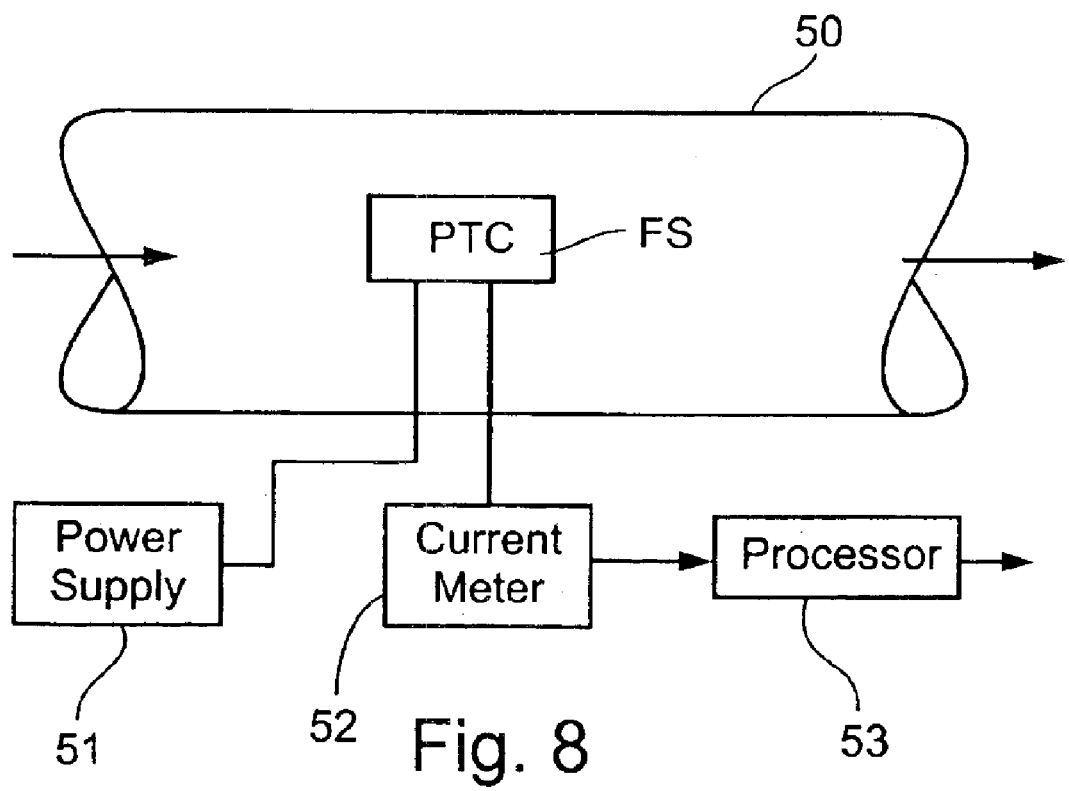
FIG. 8 is a block diagram of a wind tunnel constructed in accordance with the present invention.

The Embodiment of FIG. 8

FIG. 8 illustrates a wind tunnel constructed in accordance with the present invention for measuring the flow velocity of wind through the tunnel. The wind tunnel illustrated in FIG. 8 is basically of the same construction as described above with respect to FIG. 1, except that, since it measures only wind velocity and not heat flow, the initial and final temperature sensors ($TS_1$, $TS_2$ in FIG. 1) are not needed.

Thus, as shown in FIG. 8, the illustrated wind tunnel includes a tunnel or duct 50 having a flow sensor FS therein in the form of a PTC thermistor; a power supply 51 for applying electrical current through the thermistor to heat it to, and to maintain it at, a predetermined temperature above that of the flowing air through the wind tunnel; a current meter 52 for measuring the electrical current through the PTC thermistor FS; and a processor 53 for producing from the measured current a measurement of the flow velocity of the air within the wind tunnel. Thus, as described above, the electrical current through the PTC thermistor FS will vary with the thermal load thereon, and the thermal load will vary with the rate at which heat is dissipated from the thermistor by the flowing air, so that the electrical current through the thermistor will represent a measurement of the flow velocity of the wind through the tunnel.

It will be appreciated that the advantages described above in using a PTC thermistor as the flow sensor will also be applicable to this implementation of the invention.

While the invention has been described with respect to several preferred embodiments, it will be appreciated that these are set forth merely for purposes of example, and that many other variations, modifications and applications of the invention may be made.

What is claimed is:

1. A method of measuring the flow velocity of a flowing fluid, comprising:
   immersing within the flowing fluid an electrical resistor having a resistance varying with temperature;
   applying electrical current through the electrical resistor to heat it to a predetermined temperature above that of said flowing fluid; and
   measuring the rate of change in resistance of said electrical resistor to produce a measurement of the rate of thermal heat dissipation caused by said flowing fluid in which the electrical resistor is immersed, and thereby a measurement of the flow velocity of said flowing fluid;
   characterized in that said electrical resistor is a positive temperature coefficient thermistor driven by a constant voltage source and having a resistance which increases sharply at said predetermined temperature, such that the thermistor is automatically self-controlled to substantially maintain said predetermined temperature, whereby the electrical current drawn by said thermistor is a measurement of the thermal load on the thermistor resulting from the thermal heat dissipation therefrom by the flowing fluid, and thereby a measurement of the flow velocity of the fluid.

2. The method according to claim 1, wherein said flowing fluid is a working fluid in a heat flow system in which the working fluid has an initial temperature at the inlet to said system and a final temperature at the outlet from said system; and
   wherein the initial temperature of the working fluid and final temperature of the working fluid are also measured and utilized, with the flow velocity measurement, to produce a measurement of the rate of heat flow in said system.

3. The method according to claim 2, wherein said initial temperature and final temperature of the working fluid are each measured by a negative temperature coefficient thermistor.

4. The method according to claim 2, wherein said heat flow system is a centralized heating or cooling system for supplying heated or cooled air to a plurality of utilization units; the flow velocity, initial temperature, and final temperature of the working fluid supplied to each of said utilization units being measured and utilized to produce a measurement of the rate of heat flow in each of said utilization units.

5. The method according to claim 4, wherein each of said utilization units is an apartment unit to be heated or cooled.

6. The method according to claim 4, wherein each of said utilization units is a workpiece processing unit utilizing heat or cold during a workpiece treating process.

7. The method according to claim 1, wherein the velocity of said flowing fluid is measured along each of two non-parallel axes to produce a measurement of both the flow velocity and the flow direction of the flowing fluid.

8. The method according to claim 7, wherein the flowing fluid is the wind, and the flow velocity of the wind is measured in a duct system including at least two ducts aligned along axes at an angle to each other.

9. The method according to claim 8, wherein said duct system includes a first pair of ducts along a first axis, and a second pair of ducts along a second axis orthogonal to said first axis.

10. The method according to claim 9, wherein the ducts of each pair are located side-by-side along parallel axes; and wherein each of said ducts is tapered from a large-diameter at one end to a small-diameter at the opposite end; the ducts of each pair being oppositely disposed such that each end of each pair of ducts includes the large-diameter end of one duct of the pair, and the small-diameter end of the other duct of the pair.

11. The method according to claim 10, wherein a said positive coefficient temperature thermistor is located in the large-diameter end of each duct.

12. The method according to claim 9, wherein the ducts of said first pair are coaxially aligned with each other along said first axis, and the ducts of said second pair are coaxially aligned with each other along said second axis orthogonal to said first axis.

13. The method according to claim 12, wherein each of said ducts has an outer end exposed to the wind and including a said positive temperature coefficient thermistor, and an inner end angularly displaced with respect to its outer end for mounting the respective duct.

14. The method according to claim 1, wherein the flow velocity of said flowing fluid is measured in a wind tunnel.

15. Apparatus for measuring the flow velocity of a flowing fluid, comprising:
an electrical resistor having a resistance varying with temperature to be immersed in the flowing fluid;
a power supply for supplying said electrical resistor with electrical current to heat it to a predetermined temperature above that of the flowing fluid; and
a processor for measuring the change in resistance of said electrical resistor to produce a measurement of the rate of thermal heat dissipation caused by the flowing fluid in which the electrical resistor is immersed, and thereby a measurement of the flow velocity of the flowing fluid;
characterized in that said electrical resistor is a positive temperature coefficient thermistor driven by a constant voltage from said power supply and having a resistance which increases sharply at said predetermined temperature at which it is maintained by said constant voltage, such that the thermistor is automatically self-controlled to substantially maintain said predetermined temperature, whereby the electrical current drawn by said thermistor is a measurement of the thermal load on the thermistor resulting from the thermal heat dissipation therefrom by the flowing fluid, and thereby a measurement of the flow velocity of the fluid.

16. The apparatus according to claim 15:
wherein said flowing fluid is a working fluid in a heat flow system in which the working fluid has an initial temperature at the inlet to said system and a final temperature at the outlet from said system;
wherein said apparatus further comprises temperature sensors for measuring the initial temperature of the working fluid; and
wherein said processor utilizes said temperature measurements with the flow velocity measurement to produce a measurement of the rate of heat flow in said system.

17. The apparatus according to claim 16, wherein said initial temperature and final temperature of the working fluid are measured by negative temperature coefficient thermistors.

18. The apparatus according to claim 16, wherein said heat flow system is a centralized heating or cooling system for supplying heated or cooled air to a plurality of utilization units; and
wherein each of said utilization units includes a said positive temperature coefficient thermistor and a pair of said temperature sensors for measuring the flow velocity, initial temperature, and final temperature of the working fluid supplied to each of said utilization units, to be utilized to produce a measurement of the rate of heat flow in each of said utilization units.

19. The apparatus according to claim 18, wherein each of said utilization units is an apartment unit to be heated or cooled.

20. The apparatus according to claim 18, wherein each of said utilization units is a workpiece processing unit utilizing heat or cold during a workpiece treating process.

21. The apparatus according to claim 15, wherein said apparatus comprises a plurality of positive temperature coefficient thermistors for measuring the velocity of said flowing fluid along each of two non-parallel axes to enable said processor to produce a measurement of both the flow velocity and the flow direction of the flowing fluid.

22. The apparatus according to claim 21, wherein the flowing fluid is the wind, and the apparatus further comprises a duct system including at least two non-parallel ducts exposed to the wind for measuring the flow velocity thereof.

23. The apparatus according to claim 22, wherein said duct system includes a first pair of ducts along a first axis, and a second pair of ducts along a second axis orthogonal to said first axis.

24. The apparatus according to claim 23, wherein the ducts of each pair are located side-by-side along parallel axes; and wherein each of said ducts is tapered from a large-diameter at one end to a small-diameter at the opposite end; the ducts of each pair being oppositely disposed such that each end of each pair of ducts includes the large-diameter end of one duct of the pair, and the small-diameter end of the other duct of the pair.

25. The apparatus according to claim 24, wherein a said positive coefficient temperature thermistor is located in the large-diameter end of each duct.

26. The apparatus according to claim 22, wherein the ducts of said first pair are coaxially aligned with each other along said first axis, and the ducts of said second pair are coaxially aligned with each other along said second axis orthogonal to said first axis.

27. The apparatus according to claim 26, wherein each of said ducts has an outer end exposed to the wind and including a said positive temperature coefficient thermistor, and an inner end angularly displaced with respect to its outer end for mounting the respective duct.

28. The apparatus according to claim 15, said apparatus further comprises a wind tunnel, and said positive coefficient thermistor is mounted in said wind tunnel for measuring the flow velocity of air therethrough.

\* \* \* \* \*